United States Patent

Doi

[15] 3,639,689

[45] Feb. 1, 1972

[54] JITTER CORRECTION SYSTEM FOR MAGNETIC RECORDING AND REPRODUCING APPARATUS

[72] Inventor: Toshio Doi, Hamamatsu, Japan

[73] Assignee: Victor Company of Japan, Limited, Yokohama, Japan

[22] Filed: Nov. 20, 1969

[21] Appl. No.: 878,278

[30] Foreign Application Priority Data

Nov. 21, 1968 Japan....................................43/84825
Feb. 14, 1969 Japan....................................44/10507

[52] U.S. Cl...................178/6.6 TC, 178/6.6 P, 178/69.5 DC
[51] Int. Cl........................H04n 5/04, H04n 5/14, H04n 5/78
[58] Field of Search............178/6.6 A, 6.6 T, 6.6 P, 69.5 DC

[56] References Cited

UNITED STATES PATENTS

| | | | |
|---|---|---|---|
| 3,100,816 | 8/1963 | Coleman | 178/6.6 TC |
| 3,174,090 | 3/1965 | Hall | 178/6.6 A |
| 3,347,997 | 10/1967 | Woodruff | 178/6.6 P |
| 3,499,984 | 3/1970 | Inoue | 178/6.6 TC |

*Primary Examiner*—Howard W. Britton
*Attorney*—Louis Bernat

[57] ABSTRACT

A jitter correction system effectively corrects jitter in a television picture recorded and reproduced by a magnetic recording and reproducing apparatus. The system comprises a first phase comparator means for comparing the phase of a synchronizing signal of a reproduced video signal with the phase of an outside synchronizing signal for the vertical synchronizing interval. A phase modulation of either the outside synchronizing signal or the reproduced video signal responsive to the output of the first phase comparator means represents a detected phase difference. A second phase comparator means compares the phase of the rest of the outside synchronizing signal and the reproduced video signal with the phase of the output signal of the phase modulator means, for the horizontal synchronizing interval. The output of the second phase comparator means represents a detected jitter component corresponding to the distortion of the reproduced television picture. This output is utilized for effecting a correction of the jitter of the reproduced television picture.

9 Claims, 33 Drawing Figures

INVENTOR
TOSHIO DOI
BY Louis Bernat
ATTORNEY

INVENTOR
TOSHIO DOI

BY

ATTORNEY

INVENTOR

TOSHIO DOI

BY Louis Bernat

ATTORNEY

INVENTOR

TOSHIO DOI

BY

ATTORNEY

INVENTOR

TOSHIO DOI

BY Louis Bernat

ATTORNEY

JITTER CORRECTION SYSTEM FOR MAGNETIC RECORDING AND REPRODUCING APPARATUS

This invention relates to jitter correction systems for magnetic recording and reproducing apparatus. More particularly, the invention deals with a system for effectively correcting the jitter of a television picture reproduced by means of a magnetic recording and reproducing apparatus.

The inventive apparatus is adapted to record and reproduce video signals in oblique tracks on a magnetic tape, by means of a plurality rotary of magnetic heads. The correction system is adapted to detect only the jitter components of the reproduced television picture caused by the operation of said apparatus. For example, jitter may result from a stretching of the magnetic tape or the rate of rotation of the rotary magnetic heads. The system controls, for example, a variable delay circuit inserted in the path of the reproduced video signal, by the output of a jitter detecting means, whereby the jitter can be corrected effectively.

Generally, the horizontal synchronizing signal of a video signal is recorded on and reproduced from a magnetic tape by means of a magnetic video signal recording and reproducing apparatus (hereinafter referred to as a VTR). This synchronism signal may show sudden variations in phase before and after the switching from one magnetic head to the other, if there are variations either in the stretching of the magnetic tape between the recording mode and playback mode or in the defective mounting of the magnetic heads. This variation may cause a curving in the upper portion of a reproduced television picture or a swinging of the upper portion of the reproduced picture to right and left. When a sudden variation occurs in the stretching of the magnetic tape, the picture is distorted. This phenomenon is not desirable because it greatly impairs the stability of the reproduced television picture.

The methods, that have hitherto been employed for correcting this phase difference due to discontinuity of the horizontal synchronizing signal, include the follows:

1. One method of controls a variable delay circuit inserted in the path of the reproduced video signal responsive to a phase difference detected by comparing the reproduced video signal of the VTR with a reference signal form an external synchronizing signal generator for horizontal synchronizing interval; and 2. Another method of controls a variable delay circuit inserted in the path of the reproduced video signal responsive to a phase difference detected by comparing the phase of the reproduced synchronizing signal with the phase of a reference synchronizing signal of 15.75 kHz. generated by actuating an AFC oscillator by the reproduced synchronizing signal.

When a variable delay circuit is utilized as aforementioned, it is not possible to apply a signal representing the detected jitter to the variable delay circuit without any processing because the range of correction for jitter is only several milliseconds. Therefore, it has hitherto been customary to separate jitter components into those components which are relatively low in amplitude and relatively high in frequency to and apply these separated components to the variable delay circuit.

The above described methods have many disadvantages. Method (1) does not lend itself to use when a reproduced video signal involves a big variation in phase. In method (2), the output of the phase comparator has phase characteristics and amplitude characteristics which are attributed to the time constant circuit of the AFC oscillator. Because the reference synchronizing signal is formed by using the AFC oscillator, it is not possible to correct effectively certain frequency components of the jitter by this method. When the method (2) is used, switching from one magnetic head to the other is effected every one-sixtieth of a second in VTR's of the two magnetic head system. However, the interval may vary depending on the time constant circuit of the AFC oscillator selected. It is quite difficult to impart sufficient phase characteristics and amplitude characteristics to the basic wave (60 Hz.) component and higher frequency components of the jitter caused by irregularities in the switching between the magnetic heads, because it is necessary to maintain the stability of the AFC oscillator. Moreover, when the phase characteristics and amplitude characteristics of the jitter components are not favorable, this method has tended to increase jitter instead of reducing or eliminating it.

Generally, an analysis of the frequency components of the jitter contained in a reproduced video signal of VTR's has revealed that it is possible to divide them into two categories. First jitter components are relatively low frequency components (less than about 10 Hz.). These components are attributed to wow or flutter of the tape drive mechanism. The other jitter components are relatively high frequency (more than about 30 Hz. in VTR's of the two magnetic head system). These components are attributed to variations in the stretching of the magnetic tape or in the rate of movement of the magnetic heads during their one complete revolution. The amplitude of the lower frequency components is relatively high, sometimes reaching several H. (1 H. is 63.54 milliseconds). However, the higher frequency components have relatively low amplitude, which is only several milliseconds at most. In conventional television monitors the horizontal oscillator mechanism has AFC characteristics. Thus, the low-frequency components exert little, if any, influence, and the high-frequency components cause jitter to occur in a reproduced television picture. There is a resulting instability of the reproduced picture.

The present invention obviates this problem. More particularly, the system detects frequency components of jitter caused by variations in the stretching of magnetic tape, variations in phase of the horizontal synchronizing signal occurring before and after switching from one magnetic head to the other due to defective mounting of the magnetic heads, or other variations in the rate of rotation of the magnetic heads, without detecting low frequency components of jitter. The output of the detection means, representing the detected jitter components, is utilized to control a variable delay circuit inserted in the path of the reproduced video signal, to thereby effectively correct the distortion of a reproduced television picture.

Accordingly, a principal object of this invention is to provide a jitter correction system for magnetic recording and reproducing apparatus. Here, an object is to detect relatively high-frequency components of jitter contained without detecting relatively low-frequency components of jitter. In particular, an object is to use the output of detection means for effectively correcting the jitter of a reproduced television picture.

Another object of the invention is to provide a jitter correction system for magnetic recording and reproducing apparatus. Here, an object is to detect relatively high-frequency components of jitter which is responsible for the jitter of a reproduced television picture. In this connection, an object is to detect jitter caused by variations in the stretching of the magnetic tape, variations in phase of the horizontal synchronizing signal occurring before and after switching from one magnetic head to the other which are due to defective mounting of the magnetic heads or other causes, and variations in the rate of rotation of the magnetic heads. Thus, an object is to use the output of this detection means for controlling a variable delay circuit inserted in the path of the reproduced signal, whereby jitters of a reproduced television picture can effectively be corrected.

Still another object of the invention is to provide a jitter correction system for magnetic recording and reproducing apparatus which corrects the phase and amplitude characteristics of predetermined frequency components of a signal, such as the jitter contained in a video signal reproduced by a VTR. For example, the jitter has a spectrum of frequencies occurring noncontinuously, but at certain regular intervals or noncontinuously but intermittently.

A further object of the invention is to provide a jitter correction system for magnetic recording and reproducing apparatus which fully corrects the phase and amplitude characteristics of the 30 Hz. component and 60 Hz. component of jitter contained in a video signal, reproduced by a VTR of the two magnetic head system.

Additional objects as well as features and advantages of the invention will become evident from consideration of the description set forth hereinafter when taken in conjunction with the accompanying drawings, in which.

Figure 1:
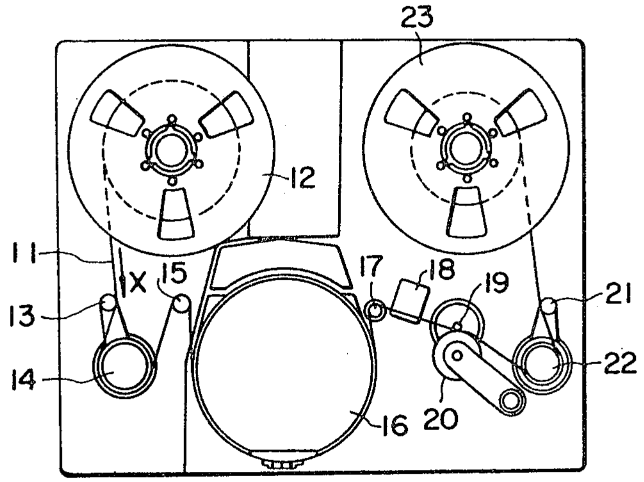
FIGS. 1 and 2 are a plan view and a fragmentary perspective view of one example of the VTR of the two magnetic head system to which the system according to this invention can be applied.
Figure 2:
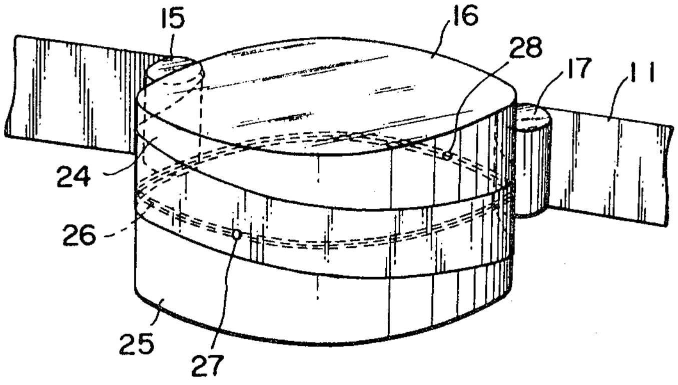

The VTR, with the two magnetic head system shown in FIG. 1, will be explained. A magnetic tape 11 is paid out from a supply reel 12 and first brought into contact with a roller 14 having a tension arm 13. The tape is guided by a tape guide roller 15, to travel around the peripheral surface of a guide drum 16, and passed by a tape guide roller 17 . The tape comes into contact with a fixed magnetic recording and reproducing head block 18 for recording and reproducing an audio signal, control signal and the like on the upper or lower marginal portion of the tape 11, in a direction aligned with the longitudinal axis of the tape. The tape is held between a pinch roller 20 and a capstan 19 rotated by a capstan motor at a constant rate of revolution determined by the fixed frequency of a power source. The tape is moved thereby in the direction of arrow X, at a constant rate. Then, the tape is wound on a takeup reel 23 after being brought into contact with a roller 22 having a tension arm 21.

The guide drum 16 comprises an upper guide drum 24 and a lower guide drum 25 separated from each other by a gap 26. Rotatably mounted inside the drum are a plurality of or two in the embodiment shown, rotary magnetic video signal recording and reproducing heads 27 and 28. The magnetic tape 11 travels around the peripheral surface of the rotary magnetic drum 16 in a direction oblique to the direction of rotation of the magnetic heads 27 and 28 for a circumferential extent of not less than 180°, or about 200°, while maintained in contact with the magnetic heads.

Accordingly, the video signal is recorded on the magnetic tape 11 in tracks laid obliquely with respect to the longitudinal axis of the tape. In each of the tracks is recorded, for playback, a television signal extending over slightly more than one field. It is to be understood that apparatus can be designed to record, in each oblique track on the magnetic tape, a television signal corresponding to one frame in place of one field.

Figure 3A:
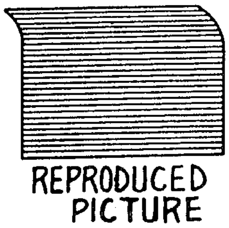
FIGS. 3A, 3B and 3C show distortion in reproduced television pictures responsive to jitter usually occur in conventional VTR's.
Figure 3B:
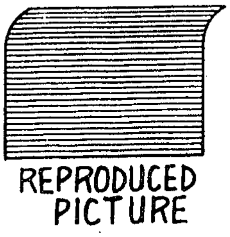
Figure 3C:
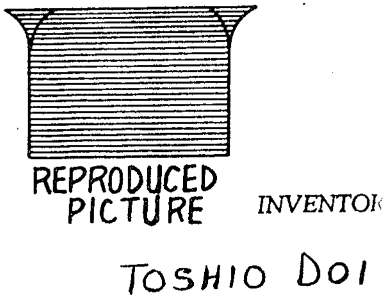
Figure 4:
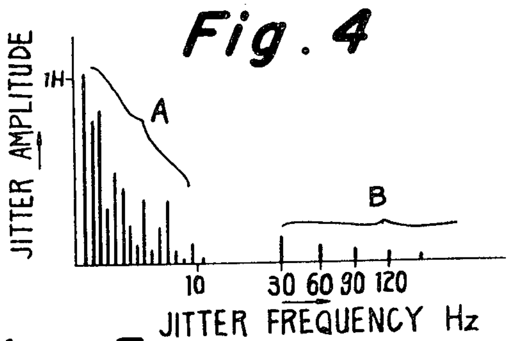
FIG. 4 shows one example of the frequency spectrum of jitter occurring in conventional VTR's.

FIGS. 3, 4 show the types of jitter which may appear in a system, such as this. More particularly, any stretching of the magnetic tape between the time of recording and the time of playback, causes the top of the picture to curve or swing, as shown in FIG. 3. FIG. 4A shows the relative amplitude of low frequency jitter caused by mechanical wow or by tape flutter. FIG. 4B shows the amplitude of jitter caused by variation of head speed or by tape stretching.

Figure 5:
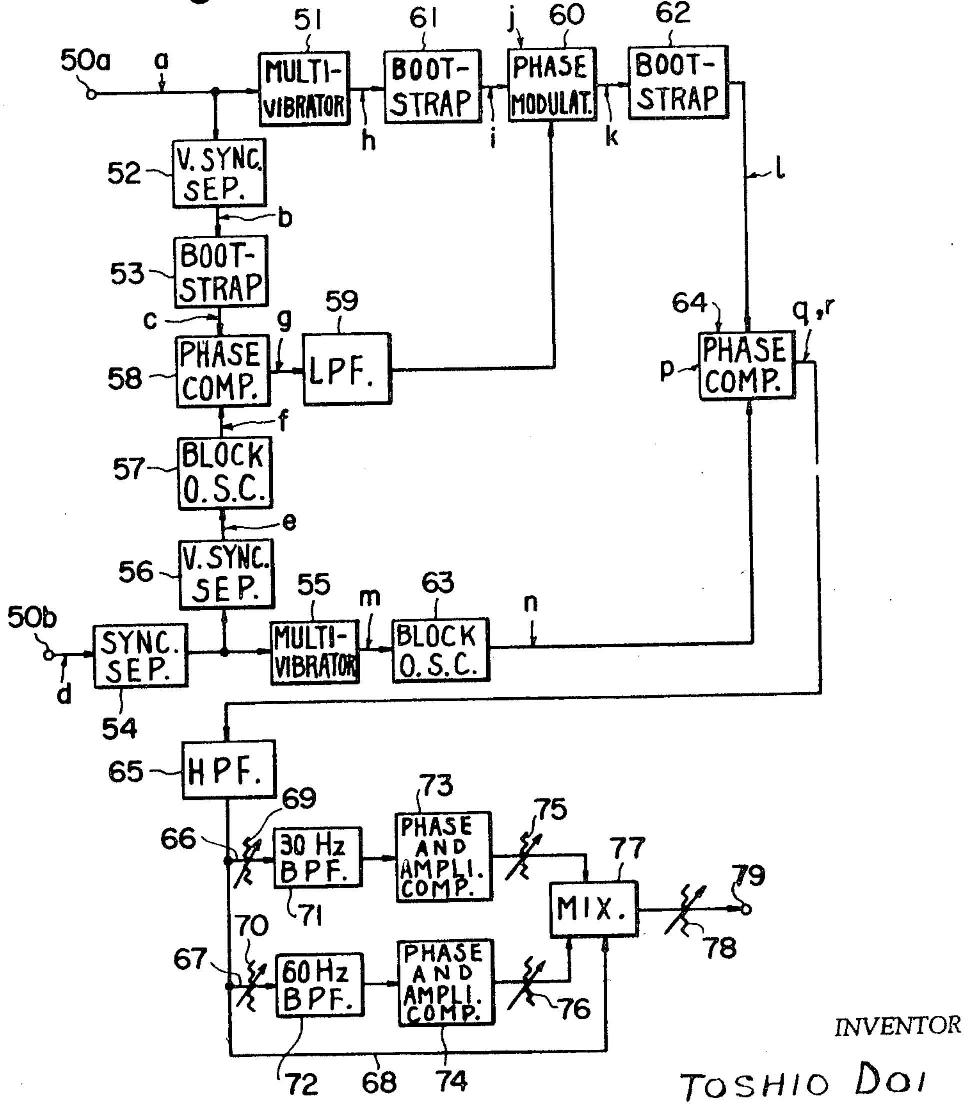
FIG. 5 is a block diagram of one embodiment of the system according to this invention.
Figures 6A, 6B, 6C, 6D, 6E, 6F, 6G, 6H, 6I, 6J, 6K, 6L, 6M, 6N, 6P, 6Q, 6R:
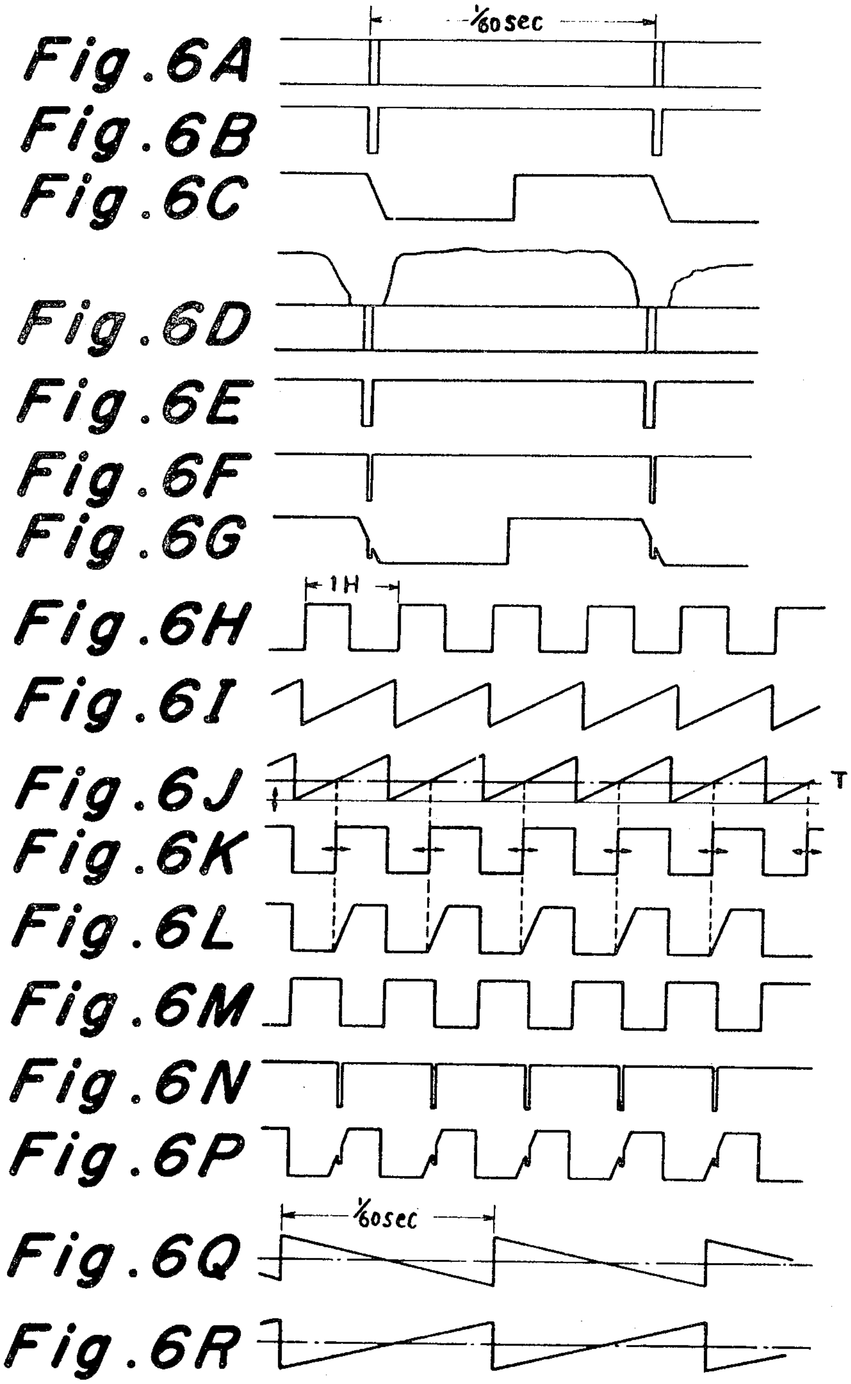
FIGS. 6A to 6R are diagrams of wave forms presented in explanation of the operation of the embodiment shown in FIG. 5.

The present invention provides a system of which one embodiment is shown in a block diagram in FIG. 5, for application to such VTR. In FIG. 5, an external synchronizing signal *a* as shown in FIG. 6A is introduced into the system through one input terminal 50*a*. On one hand, the signal is applied to a monostable multivibrator 51 and, on the other hand, to a vertical synchronizing separator circuit 52. A vertical synchronizing signal *b* as shown in FIG. 6B is separated from the external synchronizing signal at circuit 52 and applied to a bootstrap circuit 53. There it is converted into trapezoidal wave pulses *c* as shown in FIG. 6C. A video signal *d* as shown in FIG. 6D is reproduced by the VTR and introduced into the system through the other input terminal 50*b*. There signal *d* is applied to a synchronizing separator circuit 54 where two synchronizing signals are separated from the video signal *d*. One synchronizing signal is supplied to a monostable multivibrator 55 and the other synchronizing signal is supplied to a vertical synchronizing separator circuit 56. A vertical synchronizing signal *e* appears at the output of circuit 56 as shown in FIG. 6E. Then, the leading side of the vertical synchronizing signal *e* is differentiated to produce pulses which trigger a blocking oscillator 57, to form pulses *f* of uniform width as shown in FIG. 6F. The pulses *f* include low frequency components (less than about 30 Hz.) of jitter appearing in the reproduced signal. The pulses *f* and trapezoidal wave pulses *c*, from the bootstrap circuit 53, are supplied to a phase comparator 58. There the phases of the two pulses are compared and samples *g* as shown in FIG. 6G enable a detection of frequency components of less than about 30 Hz. of the jitter contained in the reproduced video signal. The output of the phase comparator 58 is supplied to a low-pass filter 59, where frequency components of more than about 10 Hz. are removed. Thus, the jitter component signals of high amplitudes and frequencies lower than about 10 Hz. are applied to a phase modulator circuit 60.

On the other hand, the external synchronizing signal *a* is introduced into the system through the input terminal 50*a* and supplied to the monostable multivibrator 51. There it is converted into pulses *h* of one horizontal synchronizing interval as shown in FIG. 6H. These pulses are supplied to a bootstrap circuit 61 where sawtooth wave pulses *i* as shown in FIG. 6I are produced and supplied to the phase modulator circuit 60.

The level T (FIG. 6J of the signal *j* is controlled by the output of the low-pass filter 59 in the phase modulator circuit 60. In the phase modulator circuit 60, which is a Schmidt trigger circuit, the phase of the leading side of rectangular wave pulses *k* as shown in FIG. 6K will be modulated, if the level T of the signal *j* as shown in FIG. 6J is controlled by low-frequency components of jitter.

The leading sides of pulses *k* have the same components of jitter as the low-frequency components of jitter contained in the reproduced video signal. Stated differently, the signal has been phase modulated so as to have the same jitter. This modulation is shown in FIG. 6K by double ended arrows. The leading side of the signal *k* actuates another bootstrap circuit 62 which produces trapezoidal wave pulses *l* as shown in FIG. 6L.

These pulses are used as a reference signal for effecting phase comparison for the horizontal synchronizing interval in the next step. The phase comparator circuit 60 and bootstrap circuit 61 make up a phase comparator circuit for effecting phase modulation in one stage, in approximately the same time period as is required one horizontal synchronizing period (63.5 milliseconds). In cases where the jitter contained in a reproduced video signal extends over one horizontal synchronizing period, a plurality of phase comparator circuits may be connected to effect phase modulation in a plurality of stages.

On the other hand, the signal separated from the reproduced video signal at the synchronizing separator circuit 54 is converted at the monostable multivibrator 55 into rectangular wave pulses *m* of one horizontal synchronizing interval as shown in FIG. 6M. The trailing sides of pulses *m* are used to trigger a blocking oscillator 63 and produce sampling pulses *n* as shown in FIG. 6N. The pulses *n* produced by the oscillator 63 and the trapezoidal wave pulses *l* from the bootstrap circuit 62 are supplied to a phase comparator 64 and sampled *p* as shown in FIG. 6P, so as to detect a phase difference. The pulses *p*, which are produced from the reproduced video signal, include jitter of the VTR. The trapezoidal wave pulses include low-frequency components of jitter. Therefore, the low-frequency components of jitter are cancelled, and they do not appear in the output of the phase comparator 64. Thus, the output *g*, *r* represents the relatively high-frequency components of jitter corresponding to the jitter of a reproduced television picture. The output of phase comparator 64 assumes a waveform *g* or a waveform *r* as shown in FIG. 6Q or FIG. 6R respectively—which is identical with the waveform shown in FIG. 7A or FIG. 7B respectively.

Figure 7A:
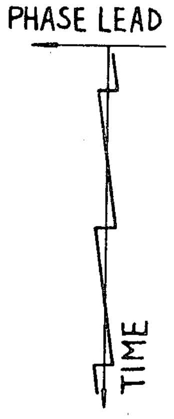
FIGS. 7A and 7B show a phase difference between the reproduced horizontal synchronizing signal and an external synchronizing signal.
Figure 7B:
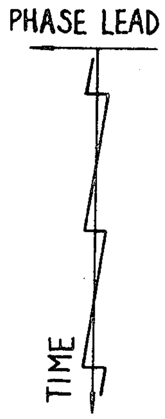

FIGS. 7A and 7B show a phase difference between the reproduced horizontal synchronizing signal and the external synchronizing signal, corresponding to the television picture on a monitor produced by the external synchronizing signal to the VTR.

By using the signal representing a phase difference, which is detected as aforementioned, for controlling a variable delay circuit inserted in the path of the reproduced video signal in the VTR, it is possible to correct jitter of the reproduced television picture.

In the embodiment shown and described, phase comparison is effected for the vertical synchronizing interval and then an external synchronizing signal is phase modulated by a voltage corresponding to the detected phase difference. It should be understood that the invention is not limited to this arrangement, and that the synchronizing signal separated from the reproduced video signal of VTR may be phase modulated by the voltage representing the detected phase difference in such a manner that the lower frequency components of jitter may be cancelled.

It should be noted, however, that in VTR's of the two magnetic head system (to which the system according to this invention is applicable) the rotary magnetic heads rotate at a rate of 30 revolutions per second. Thus, high-frequency components in the frequency spectrum of jitter are limited to the 30 Hz. component, and the components which are obtained by multiplying the 30 Hz. by integers. However, the jitter can be detected by effecting a phase comparison of an external synchronizing signal and a reproduced video signal of the VTR for the horizontal synchronizing interval. The detected signal has hitherto been utilized for reducing jitter included in a video signal (and other purposes) by causing the signal to be fed back to the servo system or to actuate a variable delay circuit included in the path of the reproduced video signal. When the detected signal is used to actuate the variable delay circuit, it is not possible to apply the detected jitter signal to the variable delay circuit without any processing, because the range of correction of jitter is only several milliseconds at most. Therefore, the present invention contemplates the provision of means for obtaining, from the detected jitter signal, only the components of relatively low amplitudes and relatively high frequencies and for applying the components of jitter signal to the variable delay circuit.

Figure 9:
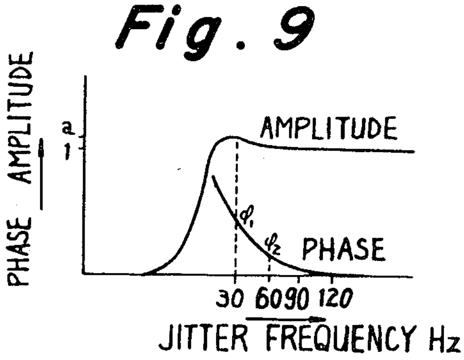
FIG. 9 is a diagram showing the phase and amplitude characteristics of a filter of the high-pass type.

In order to separate the jitter components of low amplitudes and high frequencies from jitter components of high amplitudes and low frequencies, a filter 65 (FIG. 5) of the high-pass type (or a circuit equivalent to the filter) may be provided after the phase comparator 64. The phases and amplitudes of jitter components, whose frequencies are disposed near the cutoff frequency of this filter, will undergo changes. If filter 65 is adapted to pass higher frequency phase components and amplitudes as shown in FIG. 9, a jitter component of 30 Hz. will have its amplitude multiplied by *a* and its phase varied into $\phi_1$. A jitter component of 60 Hz. will not undergo an appreciable amplitude change, but its phase will be varied into $\phi_2$. The use of a filter entails changes in the phase and amplitude of jitter components, as aforementioned.

When the jitter signals passed by filter 65 are used for actuating a variable delay circuit, it is possible to correct jitter components of more than 90 Hz. but it is not possible to effectively correct jitter components of 30 Hz. and 60 Hz. However, since the jitter components passed by the filter 65 are distributed at regular intervals in the spectrum of frequencies, such as 30 Hz., 60 Hz., 90 Hz. . . ., it is possible to effect correction of phase and amplitude characteristics of jitter components, near the cutoff frequency of the filter, which tend to undergo great changes in phase and amplitude.

Let us consider a jitter component of 30 Hz. for example. The amplitude of this component is multiplied by *a* and the phase thereof is varied into $\phi_1$, as aforementioned, after being passed by the filter 65. The signal can be expressed by $a \sin(\omega t+\phi_1)$ by assuming that the angular velocity is $\omega$. A signal whose amplitude is 1 and whose phase is zero is produced by adding a signal of 30 Hz. having an amplitude of *b* and a phase of $\phi$ to this jitter component signal. One has only to obtain the values of *b* and $\phi$ which satisfy the following formula:

$$a \sin(\omega t+\phi_1)+b \sin(\omega t+\phi)=\sin \omega t$$

Accordingly $$(a \cos \phi_1+b \cos \phi) \sin \omega t+(a \sin \phi_1+b \sin \phi) \cos \omega t=\sin \omega t$$

Therefore $$a \cos \phi_1+b \cos \phi=1$$

$$a \sin \phi_1+b \sin \phi=0$$

From the above two equations, it is possible to obtain the following values:

$$b=\sqrt{1+a^2-2a \cos \phi_1} \text{ or } -\sqrt{1+a^2-2a \cos \phi_1}$$

$$\phi=\tan^{-1}\frac{a \sin \phi_1}{a \cos \phi_1-1}$$

It will thus be evident that the signal which has its amplitude multiplied by *a* and its phase varied into $\phi$(when passed by the filter 65) can be made to have its amplitude and phase restored to the original values. This restoration is done by adding to the signal passed by the filter, a signal of the same frequency 68 (FIG. has an amplitude of $$\sqrt{1+a^2-2a \cos \phi} \text{ (or} -\sqrt{1+a^2-2a \cos \phi}\text{)}$$

and a phase of $\tan^{-1}\frac{a \sin \phi}{a \cos \phi-1}$.

This correction is effected with respect to jitter components disposed near the cutoff frequency of the filter, which tend to suffer great changes in amplitude and phase when passed by the filter. Therefore, it is possible to provide the best filter that can be made. It should be noted that correction of phase and amplitude, as aforementioned, can be effected only in cases where components of a signal are distributed at regular intervals or noncontinuously in a frequency spectrum.

Figure 10:
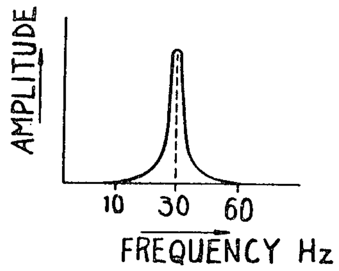
FIGS. 10 and 11 are diagrams showing the amplitude characteristics of a 30 Hz. band-pass filter and a 60 Hz. band-pass filter respectively.
Figure 11:
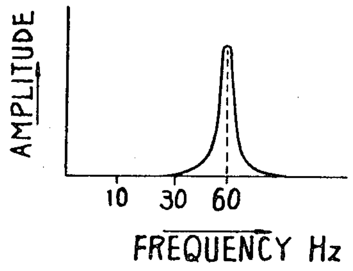
Figure 8A:
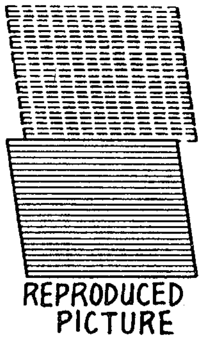
FIGS. 8A and 8B show television pictures reproduced on a monitor, by applying a synchronizing signal from outside the system, to a conventional VTR's.
Figure 8B:
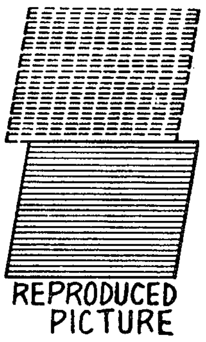

The output of the high-pass filter 65 appears on lines 66, 67 and 68 (FIG. 5). The output appearing on the lines 66 and 67 is applied to gain controls 69 and 70, respectively, where it has its gain adjusted. Then, it is applied to a 30 Hz. band filter and a 60 Hz. band filter 71 and 72, respectively. Each filter 71, 72 consists of an RC parallel T-type circuit of amplitude characteristics shown in FIG. 10 and FIG. 11, respectively. This takes out a 30 Hz. jitter component and a 60 Hz. jitter component of which phase and amplitude are to be corrected. The 30 Hz. component and the 60 Hz. component passed by the filters 71 and 72 respectively are then supplied to phase and amplitude correction circuits 73 and 74 respectively. There the phases and amplitudes are adjusted before being added to the phases and amplitudes of respective frequency components for satisfying the aforementioned formulas. The outputs of the phase and amplitude correction circuits 73 and 74 are supplied to phase controls 75 and 76 respectively, where the phases are adjusted. The outputs of the phase controls 75 and 76 are supplied to a mixer 77, where the two components are combined for effecting correction of phase and amplitude characteristics. The output of the high-pass filter 65 is supplied directly to the mixer 77 through the line 68. The outputs of the phase and amplitude correction circuits 73 and 74 are combined at the mixer 77 to effect phase and amplitude correction as desired. The output of the mixer 77 is supplied to a gain control 78 where the gain of the signal as a whole is adjusted. The output of the gain control 78 is taken out through an output terminal 79 as a signal with the phase and amplitude characteristics shown in FIG. 12.

Figure 12:
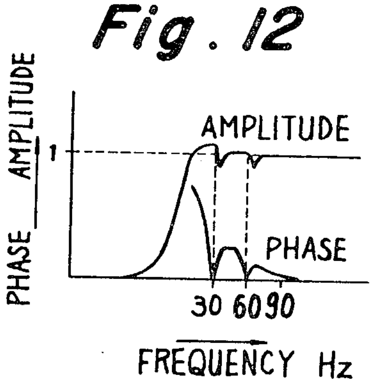
FIG. 12 is a diagram showing the phase and amplitude characteristics improved by the system according to this invention.

FIG. 12 shows the phase and amplitude characteristics of 30 Hz. and 60 Hz. components which have undergone changes when passed by the high-pass filter 65 and which have then been subjected to correction. It will be evident from FIG. 12 that only the components of 30 Hz. and 60 Hz. which have been subjected to correction show the results of correction. It appears that the amplitude characteristics of the jitter components disposed near the frequencies of 30 Hz. and 60 Hz. in the frequency spectrum show deterioration. However, it should be noted that the aforementioned correction has effect in a signal, such as a jitter signal, in which frequency components are not continuous.

One embodiment of the essential portions of the block diagram of FIG. 5, following the high-pass filter 65, will now be explained with reference to the circuit diagram of FIG. 13.

Figure 13:
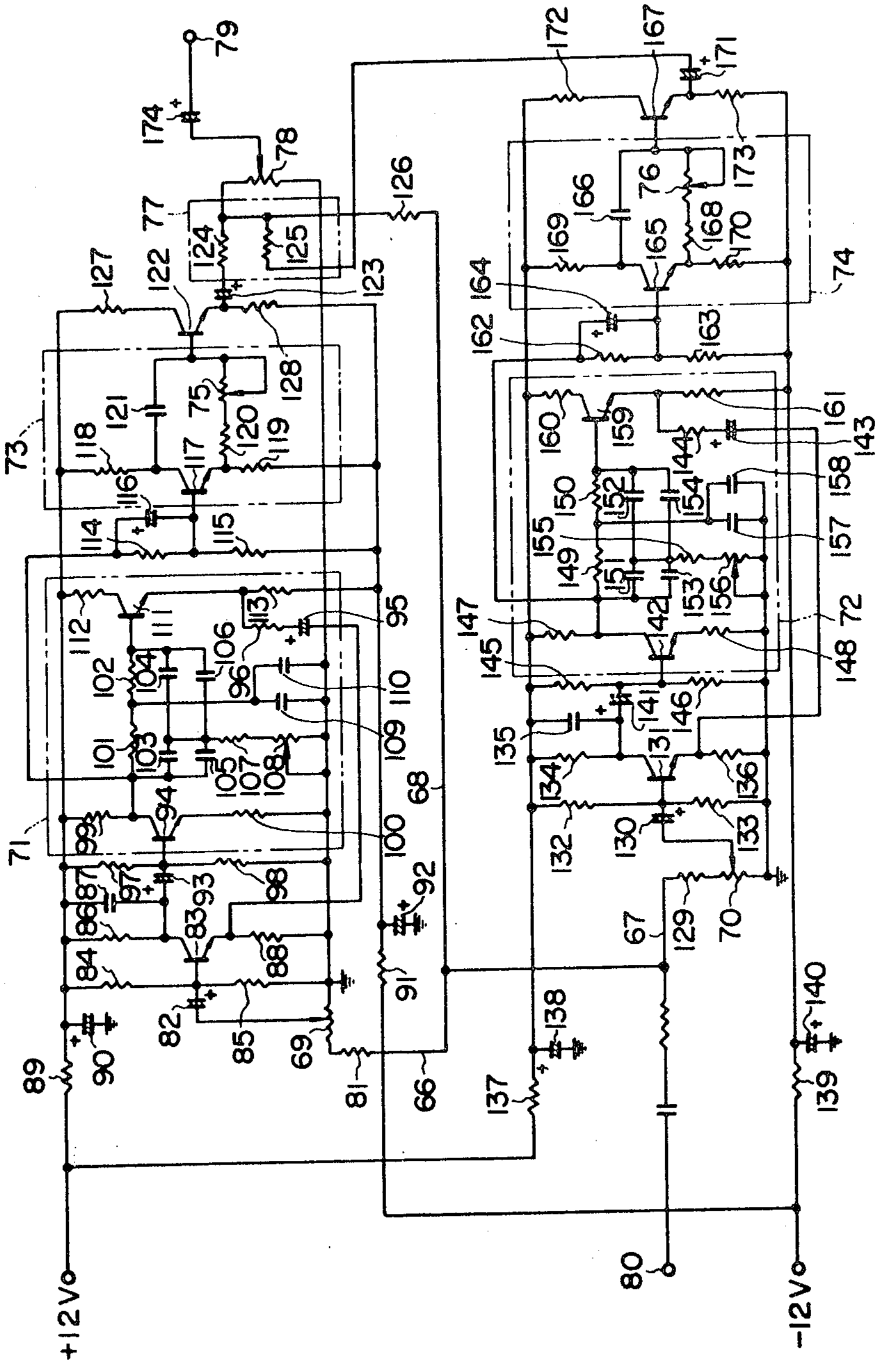
FIG. 13 is a circuit diagram of one embodiment showing essential portions of the embodiment of system shown in the block diagram in FIG. 5.

In FIG. 13, a terminal 80 is connected to the output of high-pass filter 65. The output of filter 65 is passed through the terminal 80, appearing on the line 66. From there, it is passed successively through a resistor 81, a variable resistor 69 serving as a gain control and a capacitor 82 before being applied to the base electrode of a transistor 83. The circuit including transistor 83 is an amplifier, the collector electrode of the transistor 83 being connected to the base electrode of a transistor 94 through a capacitor 93. The emitter electrode of transistor 83 is connected to the emitter electrode of a transistor 111, through a capacitor 95 and a resistor 96. Connected between transistors 94 and 111 is an RC parallel T-type circuit consisting of resistors 101, 102 and 107, a variable resistor 108, and capacitors 103, 104, 105, 106, 109 and 110, all of which make up the 30 Hz. band-pass filter 71.

A 30 Hz. signal output is produced at the point of connection between the collector electrode of transistor 94 and the resistor 101, and is applied to the base electrode of a transistor 117 through a parallel circuit consisting of a resistor 114 and a capacitor 116. The circuit including transistor 117 is the phase and amplitude correction circuit 73 for the 30 Hz. component. The collector electrode of transistor 117 is connected to the base electrode of a transistor 122 through a capacitor 121, and the emitter electrode of said transistor 117 being is connected to the base electrode of the transistor 122 through a resistor 120 and a variable resistor 75 serving as a phase control.

The emitter electrode of transistor 122 is connected to a resistor 124 through a capacitor 123, the resistor 124 together with a resistor 125 making up the mixer 77.

On the other hand, the output of the high-pass filter 65 is also passed through the terminal 80 to the line 67, and is passed successively through a resistor 129, a variable resistor 70 (serving as a gain control) and a capacitor 130 before being applied to the base electrode of a transistor 131. The circuit including transistor 131 is an amplifier. The collector electrode of transistor 131 is connected to the base electrode of a transistor 142 through a capacitor 141, and the emitter electrode of transistor 131 is connected to the emitter electrode of a transistor 159, through a capacitor 143 and a resistor 144. Connected between transistors 142 and 159 is an RC parallel T-type circuit consisting of resistors 149, 150 and 155, a variable resistor 156 and capacitors 151, 152, 153, 154, 157 and 158, all of which make up the 60 Hz. band-pass filter 72.

A 60 Hz. signal output is produced at the point of connection between the collector electrode of transistor 142 and the resistor 149, and is applied to the base electrode of a transistor 165, through a parallel circuit consisting of a resistor 162 and a capacitor 164. The circuit including transistor 165 is the phase and amplitude correction circuit 74 for the 60 Hz. component. The collector electrode of transistor 165 is connected to the base electrode of a transistor 167 through a capacitor 166, and the emitter electrode of transistor 165 is connected to the base electrode of transistor 167 through a resistor 168, and a variable resistor 76 serving as a phase control.

The emitter electrode of transistor 167 is connected through a capacitor 171 to the resistor 125 making up the mixer 77.

The output of the high-pass filter 65 also appears on the line 68 and is passed through a resistor 126 directly to the mixer 77.

The output of the mixer 77, which has had its phase and amplitude corrected as desired, is passed through the variable resistor 78 and a capacitor 174 to an output terminal 79 through which the signal is applied to a variable delay circuit.

The values of resistors and the capacities of capacitors described above and shown in FIG. 13 are as follows:

| Numeral | Part | Resistance or capacity |
|---|---|---|
| 69 | Variable Resistor | 1 kΩ |
| 75 | Variable Resistor | 50kΩohm |
| 75 | Variable Resistor | 5 kΩ |
| 78 | Variable Resistor | 50 kΩ |
| 81 | Resistor | 10 kΩ |
| 82 | Capacitor | 47 μf. |
| 84 | Resistor | 220 kΩ |
| 85 | Resistor | 33 kΩ |
| 86 | Resistor | 12 kΩ |
| 87 | Capacitor | 0.001 μf. |
| 88 | Resistor | 1.8 kΩ |
| 89 | Resistor | 33 ohm |
| 90 | Capacitor | 100 μf. |
| 91 | Resistor | 33 ohm |
| 92 | Capacitor | 100 μf. |
| 93 | Capacitor | 47 μf. |
| 95 | Capacitor | 100 μf. |
| 96 | Resistor | 1.8 kΩ |
| 97 | Resistor | 22 kΩ |
| 98 | Resistor | 2.7 kΩ |
| 99 | Resistor | 12 kΩ |
| 100 | Resistor | 1.8 kΩ |
| 101 | Resistor | 100 kΩ |
| 102 | Resistor | 100 kΩ |
| 103 | Capacitor | 0.047 μf. |
| 104 | Capacitor | 0.047 μf. |
| 105 | Capacitor | 0.0082 μf. |
| 106 | Capacitor | 0.0082 μf. |
| 107 | Resistor | 22 kΩ |
| 108 | Variable Resistor | 50 kΩ |
| 109 | Capacitor | 0.0 μf. |
| 110 | Capacitor | 0.015 μf. |
| 112 | Resistor | 220 ohm |
| 113 | Resistor | 5.6 kΩ |
| 114 | Resistor | 33 kΩ |
| 115 | Resistor | 33 kΩ |
| 116 | Capacitor | 47 μf. |
| 118 | Resistor | 5.6 kΩ |
| 119 | Resistor | 5.6 kΩ |
| 120 | Resistor | 22 kΩ |
| 121 | Capacitor | 0.47 μf. |
| 123 | Capacitor | 47 μf. |
| 124 | Resistor | 33 kΩ |
| 125 | Resistor | 33 kΩ |
| 126 | Resistor | 5.6 kΩ |
| 127 | Resistor | 220 ohm |
| 128 | Resistor | 5.6 kΩ |
| 129 | Resistor | 10 kΩ |
| 130 | Capacitor | 47 μf. |
| 132 | Resistor | 220 kΩ |
| 133 | Resistor | 33 kΩ |
| 134 | Resistor | 12 kΩ |
| 135 | Capacitor | 0.001 μf. |
| 136 | Resistor | 1.8 kΩ |
| 137 | Resistor | 33 ohm |
| 138 | Capacitor | 100 μf. |
| 139 | Resistor | 33 ohm |
| 140 | Capacitor | 100 μf. |
| 141 | Capacitor | 47 μf. |
| 143 | Capacitor | 100 μf. |
| 144 | Resistor | 1.8 kΩ |

| | | |
|---|---|---|
| 145 | Resistor | 220 kΩ |
| 146 | Resistor | 33 kΩ |
| 147 | Resistor | 12 kΩ |
| 148 | Resistor | 1.8 kΩ |
| 149 | Resistor | 100 kΩ |
| 150 | Resistor | 100 kΩ |
| 151 | Capacitor | 0.022 μf. |
| 152 | Capacitor | 0.022 μf. |
| 153 | Capacitor | 0.0033 μf. |
| 154 | Capacitor | 0.0033 μf. |
| 155 | Resistor | 27 kΩ |
| 156 | Variable Resistor | 50 kΩ |
| 157 | Capacitor | 0.047 μf. |
| 158 | Capacitor | 0.0068 μf. |
| 160 | Resistor | 220 ohm |
| 161 | Resistor | 5.6 kΩ |
| 162 | Resistor | 33 kΩ |
| 163 | Resistor | 33 kΩ |
| 164 | Capacitor | 47 μf. |
| 166 | Capacitor | 0.22 μf. |
| 168 | Resistor | 12 kΩ |
| 169 | Resistor | 5.6 kΩ |
| 170 | Resistor | 5.6 kΩ |
| 171 | Capacitor | 47 μf. |
| 172 | Resistor | 220 ohm |
| 173 | Resistor | 5.6 kΩ |
| 174 | Capacitor | 47 μf. |

While the invention has been shown and described with reference to preferred embodiments, it is to be understood that the invention is not limited to the specific form and elements of the embodiments, and that many changes and modifications may be made therein without departing from the spirit and scope of the invention.

What we claim is:

1. A jitter correction system for magnetic recording and reproducing apparatus comprising first phase comparator means for comparing the phase of an outside synchronizing signal with the phase of a synchronizing signal of a video signal reproduced in the magnetic recording and reproducing apparatus for each vertical synchronizing interval, means for phase modulating at least one of said outside synchronizing signals and said reproduced video signal responsive to the output of said first phase comparator means which represents a detected phase difference, second phase comparator means for comparing the phase of the rest of said outside synchronizing signal and said reproduced video signal with the phase of the output signal of said phase modulator means, filter means for separating signals of frequency components of jitter detected by said second phase comparator means and corresponding to the distortion of a reproduced television picture into a signal of jitter component of high amplitude and low frequency and a signal of jitter component of low amplitude and high frequency, a plurality of band-pass filters for passing signals of frequency components of jitter whose phase and amplitude characteristics are to be corrected out of the signals of jitter components separated by said filter means, a plurality of phase and amplitude correction means for adjusting the phases and amplitudes of the signals of frequency components passed by said plurality of band-pass filter means respectively, mixer means for combining the signals of frequency components which have had their phases and amplitudes corrected by said plurality of phase and amplitude correction means with the output of said filter means which is not passed through said band-pass filter means, and means responsive to the output of said mixer means for controlling a variable delay circuit inserted in the path of the video signal in the magnetic recording and reproducing apparatus.

2. A jitter correction system as defined in claim 1 in which said signal of jitter component of high amplitude and low frequency is a signal of frequency of 30 Hz. and said signal of jitter component of low amplitude and high frequency is a signal of frequency of 60 Hz.

3. A jitter correction system as defined in claim 1 in which said phase and amplitude correction means are adapted to correct the phases and amplitudes of said signals of frequency components in such a manner that the output signal of said mixer means is zero in phase and 1 in amplitude.

4. A jitter correction system for a video tape recorder comprising first separating means for separating pulses from an outside source to provide a signal having a vertical synchronizing repetition interval, first wave converting means for converting said signal into first trapezoidal wave pulses, second separating means for separating the vertical synchronizing signals from the video signals reproduced by said tape recorder, means triggered by the leading edges of the signals from said second separating means for forming recurring pulses having equal width, first phase comparator means for producing a first error signal responsive to a comparison of the phases of the trapezoidal wave and the pulses of equal width, second wave converting means for generating a first rectangular waveform having a horizontal synchronizing repetition rate responsive to the signal of said outside source, third wave converting means for converting said first rectangular waveform into a sawtooth wave, low-pass filter means for eliminating frequency components which are higher than about 10 Hz. from the first error signal and for providing a second error signal having only high amplitude components of a frequency which is lower than about 10 Hz., phase modulating means for phase modulating the sawtooth wave and producing a second rectangular wave having a jitter which is the same as of the frequency component lower than about 10 Hz., fourth wave converting means for converting the second rectangular wave into a second trapezoidal wave, fifth wave converting means for producing a third rectangular wave having a horizontal synchronizing interval, to which said reproduced video signal is supplied, second means triggered responsive to the trailing portion of said third rectangular wave for generating recurring sampling pulses, means for comparing the phases of the second trapezoidal wave with the sampling pulses to provide a third error signal having only a signal of high-level jitter component, and jitter correcting means comprising a variable delay circuit in the path of the reproduced video signal and operated responsive to the third error signal.

5. A jitter correction system as defined in claim 4 in which said phase modulation means comprises a Schmidt trigger circuit, and means responsive to the second error signal for controlling the level of the sawtooth wave so as to modulate the leading portion of the second rectangular wave.

6. A jitter correction system as defined in claim 4 in which the signal of high-level jitter components having the third error signal comprises a 30 Hz. signal and integer multiples thereof.

7. A system for correcting jitter in a video magnetic recording and reproducing apparatus comprising a source of outside synchronizing signals, first phase comparator means for comparing the phase of said signal from said outside source with the phase of a synchronizing signal in a video signal reproduced by the magnetic apparatus to give a detected phase difference, means for phase modulating said signal from said outside source by the output of said first phase comparator means, second phase comparator means for comparing the phase of said reproduced video signal with the phase of the phase modulated signal, filter means for separating jitter components detected by said second phase comparator means and corresponding to the distortion of a reproduced television picture, said separating means dividing said jitter components into first components of high amplitude and low frequency and second components of low amplitude and high frequency, a plurality of band-pass filter means for passing signals of jitter components whose phase and amplitude characteristics are to be corrected, a plurality of phase and amplitude correction means for adjusting the phases and amplitudes of the signals passed by said plurality of band-pass filter means, mixer means for combining the output signals of said phase and amplitude correction means with the output of said filter means, which is not passed through said band-pass filter means, and variable delay circuit means responsive to the output of said mixer means for selectively delaying the video signal reproduced by said apparatus in order to remove said jitter.

8. A jitter correction system as defined in claim 7 in which said first jitter component of high amplitude and low frequency is a signal of frequency less than 30 Hz. and said second jitter component of low amplitude and high frequency comprises a signal of frequency of 30 Hz. and integer multiples thereof.

9. A jitter correction system as defined in claim 7 in which said phase and amplitude correction means correct the phases and amplitudes of said signals of frequency components in such a manner that the output signal of said mixer means is zero in phase and 1 in amplitude.

* * * * *